(12) United States Patent
Hepner et al.

(10) Patent No.: US 7,003,409 B2
(45) Date of Patent: Feb. 21, 2006

(54) PREDICTIVE FAILURE ANALYSIS AND FAILURE ISOLATION USING CURRENT SENSING

(75) Inventors: David F. Hepner, San Jose, CA (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 10/643,253

(22) Filed: Aug. 19, 2003

(65) Prior Publication Data

US 2005/0043925 A1    Feb. 24, 2005

(51) Int. Cl.
*G01R 21/00* (2006.01)
*G06F 1/26* (2006.01)

(52) U.S. Cl. .................. 702/60; 324/763; 340/664; 361/93.8

(58) Field of Classification Search .............. 702/60, 702/63, 64, 118; 340/267, 471, 563, 648, 340/654, 662, 664; 324/73, 427, 763; 361/21, 361/90, 93.8
See application file for complete search history.

(56) References Cited

U.S. PATENT DOCUMENTS

| | | | | |
|---|---|---|---|---|
| 3,293,630 A | | 12/1966 | McKaig et al. ............ 340/662 |
| 3,962,694 A | | 6/1976 | Calia et al. ................. 340/267 |
| 4,492,999 A | | 1/1985 | Amagasa ..................... 361/21 |
| 4,857,833 A | | 8/1989 | Gonzalez et al. ............ 324/73 |
| 4,862,069 A | | 8/1989 | Albee ........................... 324/73 |
| 4,951,171 A | | 8/1990 | Tran et al. .................... 361/90 |
| 5,512,883 A | * | 4/1996 | Lane, Jr. ...................... 340/648 |
| 5,781,024 A | * | 7/1998 | Blomberg et al. .......... 324/763 |
| 6,104,304 A | | 8/2000 | Clark et al. ................. 340/664 |
| 6,167,525 A | * | 12/2000 | Donazzi et al. ............ 361/93.8 |
| 6,191,697 B1 | | 2/2001 | Hansen et al. .............. 340/652 |

FOREIGN PATENT DOCUMENTS

| | | |
|---|---|---|
| JP | 07-218595 | 8/1995 |
| JP | 10-090356 | 4/1998 |
| JP | 11-168179 | 6/1999 |
| JP | 2000-065890 | 3/2000 |
| JP | 2000-230962 | 8/2000 |
| JP | 2000-258490 | 9/2000 |

* cited by examiner

*Primary Examiner*—Bryan Bui
*Assistant Examiner*—John Le
(74) *Attorney, Agent, or Firm*—Ido Tuchman; Randall J. Bluestone

(57) ABSTRACT

A method, system, and computer program for predicting the failure of an electronic circuit. One embodiment of the invention monitors the current utilization, environment conditions, and operating conditions of the electronic circuit. A system manager is altered if the current utilization of the electronic circuit is outside a pass range at the measured environmental conditions and the measured operating conditions of the electronic circuit. The invention may also be configured such that if the electronic circuit fails, the electronic circuit is isolated from among a plurality of potentially failed electronic circuits using the measured current utilization, environment conditions, and operating conditions of the electronic circuit.

22 Claims, 4 Drawing Sheets

PREDICTIVE FAILURE ANALYSIS AND FAILURE ISOLATION USING CURRENT SENSING

FIELD OF THE INVENTION

The present invention relates generally to predicting and isolating circuit failures, and more specifically to using supply current measurements in conjunction with operating condition measurements to predict and isolate circuit failures.

BACKGROUND

When an electronic device fails there is typically a cost associated in restoring the device's function. In some electronic systems, the cost of a device failure may be nominal, such as the cost of replacing an inexpensive component. In other systems, however, a device failure can be disastrous, causing lost revenue, lost data, and even personal injury. Consider, for example, an electronic device linking two high-speed communication lines together. If the device fails, the connection between the two lines may break and millions of dollars in revenue may be lost while the problem is located and fixed.

Although there is no way of making electronic devices fail proof, there are solutions in the art for mitigating losses due to device failures. One solution is to add redundancy to a system so that if one device fails, a backup device can quickly take over. Another solution known in the art is to frequently service, maintain and calibrate system devices. Additionally, devices are sometime replaced after a specified use period, regardless of whether or not any problems are observed.

The above solutions may not always be available in many systems. For example, adding redundancy may cause the system to operate too slowly, consume too much power, or take up too much room. Performing frequent service and maintenance on devices located in difficult to get to places may be unfeasible or impossible. Replacing devices often may be cost prohibitive.

SUMMARY OF THE INVENTION

The present invention addresses the above-mentioned limitations of traditional methods of maintaining and debugging electronic devices by providing preemptive failure prediction and failure isolation using current sensing. The present invention monitors the current signature of devices and warns of a pending failure when the current draw changes above or below a pass range. With the invention, a function can be replaced before the failure occurs, thus providing less down time for the system. The current information can further be used to help isolate failed components once a failure has occurred. For example, if a failure occurs which could involve three different assemblies, the system management could determine that one device has deviated from normal current demands. This increases the likelihood that the device with the deviated current demands is causing the failure.

Thus, an aspect of the present invention involves a method for predicting the failure of an electronic circuit in an electronic device. The method includes a first receiving operation to measured current draw from at least one voltage supply of the electronic circuit. A second receiving operation receives at least one measured environmental condition proximate the electronic circuit. The method then determines if the measured current draw is outside a pass range for the measured environment condition. If the measured current draw is outside the pass range, an alerting operation warns of a potential failure of the electronic circuit.

Another aspect of the invention is a system for predicting the failure of an electronic circuit. The system includes a current monitor configured to receive a measured value for a current draw to the electronic circuit from at least one voltage source. An environment monitor is configured to receive a measured value for at least one environmental condition of the electronic circuit, and a circuit state monitor is configured to measure at least one circuit condition of the electronic circuit. A failure alert unit is configured to provide an alert notification when the current draw to the electronic circuit is outside a pass range at the measured environmental condition and the measured operating condition of the electronic circuit.

A further aspect of the invention is a method for manufacturing an electronic circuit. The method includes assembling the electronic circuit, measuring a current draw of the electronic circuit at different environment conditions and operating conditions, and recording the current draw in an operating matrix. The operating matrix is configured to be used during normal operation of the electronic circuit to alert when the current draw to the electronic circuit is outside a pass range.

Yet another aspect of the invention is a computer program product embodied in a tangible media for predicting the failure of an electronic circuit in an electronic device. The computer program product includes computer readable program codes configured to cause the program to measure a current draw of the electronic circuit from at least one voltage supply, measure at least one environmental condition at the electronic circuit, determine if the measured current draw is outside a pass range for the measured environmental condition, and alert of a potential failure of the electronic circuit if the measured current draw is outside the pass range.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
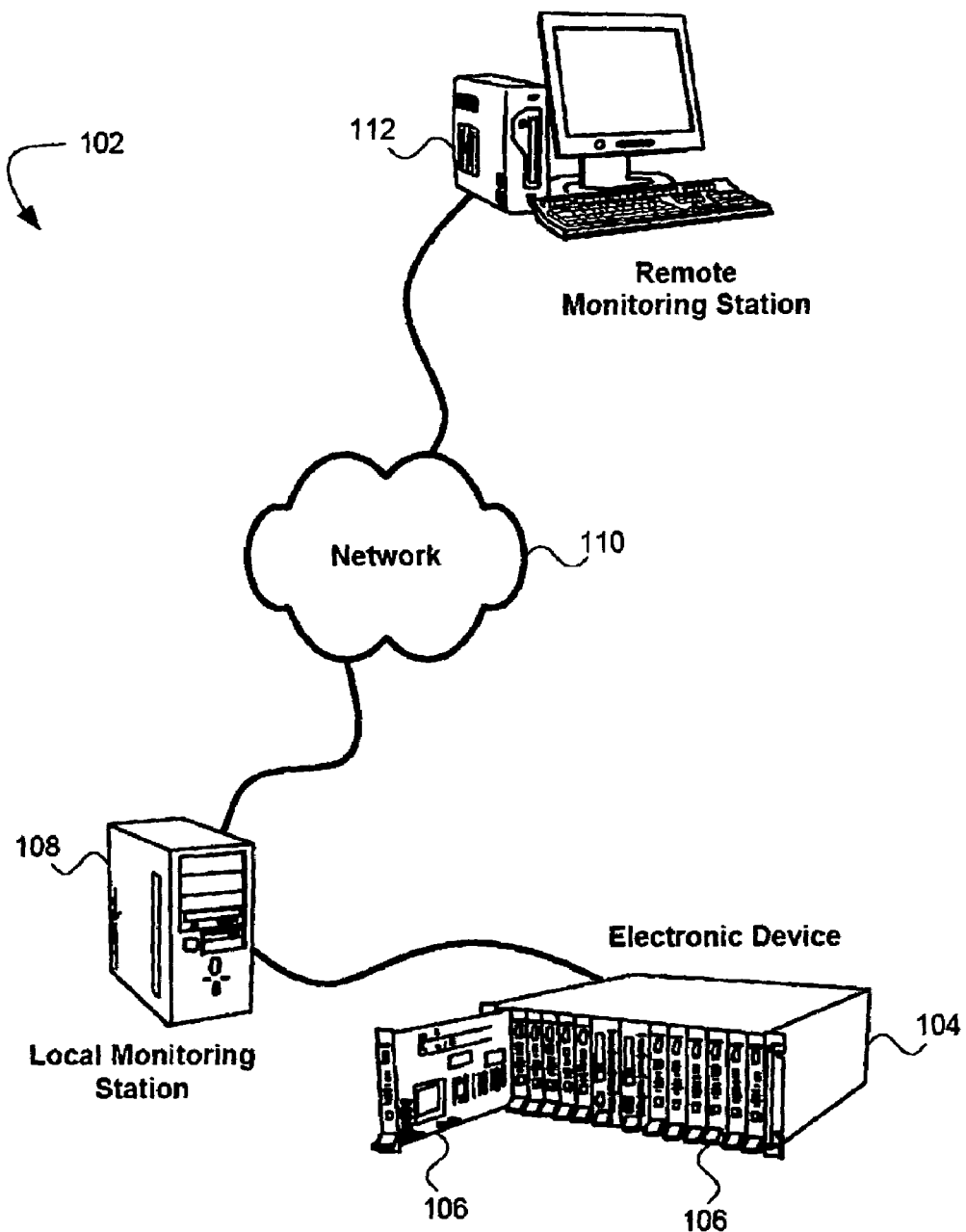
FIG. 1 shows an exemplary system environment implementing the present invention.

The following description details how the present invention is beneficially employed to preemptively alert administrators of an impending failure of electronic circuits and to help troubleshoot failed devices. Throughout the description of the invention reference is made to FIGS. 1–3. When referring to the figures, like structures and elements shown throughout are indicated with like reference numerals.

FIG. 1 shows an exemplary system environment 102 implementing the present invention. It should be noted the environment 102 is presented for illustration purposes only and is representative of countless configurations in which the invention may be implemented. Thus, the present invention should not be considered limited to the system configuration shown in the figure.

The environment 102 includes an electronic device 104 with a plurality of electronic circuits 106 (also referred to as "cards" or "blades" in some devices). The electronic device 104 may be, for example, a communication device for receiving and transmitting serial communications over several high-speed communication lines. In such an example, each electronic circuit 106 may transmit and receive data over a single high-speed communication line. Furthermore, it is contemplated that the electronic circuit 106 may be composed of ASICs and other components (logic, analog, and/or mixed signal).

The present invention can be employed to monitor each electronic circuit 106 and determine whether the circuit 106 is likely to fail in the near future. When the present invention determines that a failure is likely to occur, a system manager is alerted and the electronic circuit 106 can be replaced in a controlled manner without incurring high costs or system damage. Thus, the present invention can beneficially provide less down time for the system. Alternatively, if one of the electronic circuits 106 does fail before it can be replaced, the present invention can be used to quickly determine which of the electronic circuits 106 has failed. This can help bring the system up and running quickly, saving substantial time, effort, and money.

As described in detail below, the present invention measures the current draw of each electronic circuit 106 from its various power sources. Often times, failing and near failing circuits exhibit out-of-range current draw characteristics; either above or below normal current draw values. The present invention checks the current draw of the electronic circuit 106 to determine if it is within acceptable limits. If the current draw is determined to be inappropriate for the operating conditions, a local monitoring station 108 alerts the system manager of a possible failure occurring in the near future. At this point, the system manager may decide that the circuit has deviated from normal current demands and should be replaced before causing a system failure.

The invention can also be used to troubleshoot an electronic device 104 containing a failed circuit. In some situations, determining which circuit has failed from a group of electronic circuits 106 can be time consuming and difficult. A technician may have to spend considerable effort testing each circuit 106 to find the malfunctioning circuit. The present invention can help speed up or eliminate this process by maintaining a log of each circuit's current draw and operating conditions. When the device 104 fails, the log can be examined to determine which specific electronic circuit 106 in the device 104 exhibited signs of malfunction prior to the failure. Thus, the present invention can provide isolation of failed circuits by detection of out of range current consumption.

In one embodiment of the invention, the local monitoring station 108 is used to monitor the electronic circuits 106 in the electronic device 104. The local monitoring station 108 can be coupled to the electronic device 104 by a wired connection, a wireless connection, or a combination thereof. Furthermore, the local monitoring station 108 may be coupled to a remote monitoring station 112 via a computer network 110. The remote monitoring station 112 may be more conveniently located than the local monitoring station 108 and allow more efficient access to information by a system administrator about the electronic device 104.

Figure 2:
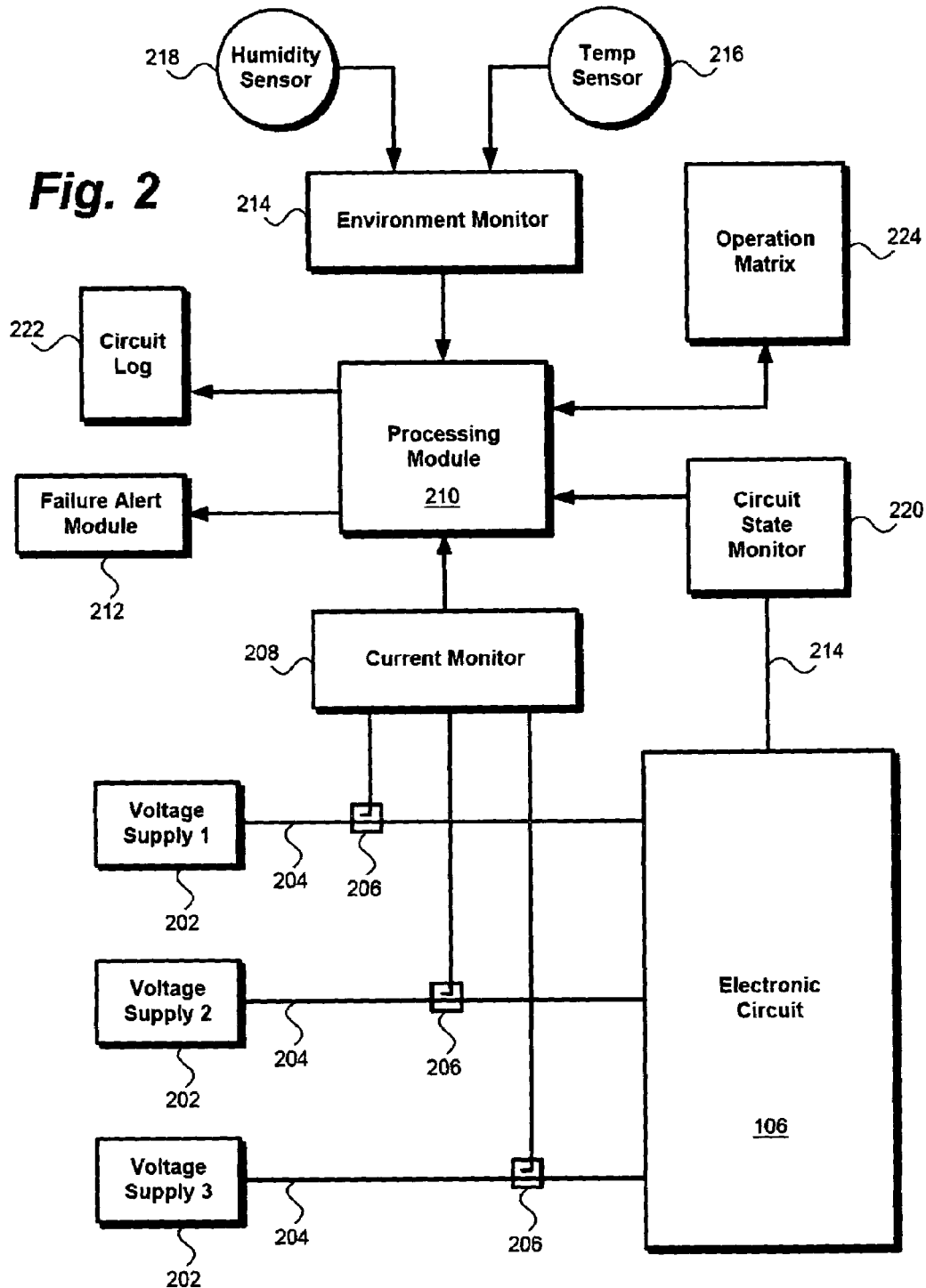
FIG. 2 shows a system for predicting the failure of an electronic circuit in accordance with one embodiment of the present invention.

In FIG. 2, a system for predicting the failure of an electronic circuit 106 in accordance with one embodiment of the present invention is shown. The system includes one or more voltage supplies 202 providing power to the electronic circuit 106. For example, Voltage Supply 1 may supply 1.5V, Voltage Supply 2 may supply 3.3V, and Voltage Supply 3 may supply 5V to the electronic circuit 106.

Current from and to the voltage supplies 202 passes through power conductors 204 coupling the voltage supplies 202 with the electronic circuit 106. One embodiment of the present invention monitors the current draw from the voltage supplies 202 using current sensors 206. The current draw measured by the current sensors 206 may be positive or negative depending on the direction of current flow. It is contemplated that various techniques known in art may be employed to measure the current draw of the electronic device 106. For example, the current sensors 206 may measure the magnetic field proximate the conductors 204. Alternatively, the current sensors 206 may include a small impedance and measure the voltage drop across the impedance to determine the current passing through the conductors 204.

The current sensors 206 are coupled to a current monitor 208. The current monitor 208 transmits the sensors' measurements to a processing module 210. The processing module 210 is configured to determine whether the current drawn by the electronic circuit 106 indicates a potential failure may occur in the near future. It is contemplated that the processing module 210 may be physically located on or off the electronic circuit 106. Furthermore, the processing module 210 may be a programmable state machine, such as an imbedded microprocessor, or a general-purpose computer performing various system functions. If the processing module 210 finds that the circuit's current draw is outside an expected range, and therefore that the chance of a circuit failure occurring soon is high, a failure alert module 212 is activated to notify a system administrator or technician of the impending failure.

In order to determine whether the current draw of the electronic circuit 106 is normal or not, the processing module 210 also receives information about the operating conditions of the electronic circuit 106. In one embodiment of the invention, the processing module 210 is coupled to an environment monitor 214. The environment monitor 214 is configured to report the circuit's environment information to the processing module 210. For instance, the environment monitor 214 may be coupled to a temperature sensor 216 and a humidity sensor 218. In some electronic circuits 106, the temperature and humidity conditions may affect the amount of current required by an electronic circuit 106. Thus, the same current drawn by the electronic circuit 106 may be normal for one temperature reading, but may be considered problematic for another temperature reading. Thus, the processing module 210 correlates the current measurements from each voltage supply 202 with the measurements from the environment monitor 214 to determine if the electronic circuit 106 is close to failing.

In addition to gathering current information and environment information, the processing module 210 may also receive circuit condition information via a state monitor 220. The state monitor 220 is configured to keep track of the electronic circuit's operating condition and to report the operating condition to the processing module 210. Consider, for example, a communication circuit having the following five possible operating conditions: self test, idle, command, read, and write. Each operating condition may cause the circuit 106 to draw a different amount of current from the voltage supplies 202. Thus, the processing module 210 can also factor the electronic circuit's operating condition into account when determining if the current draw measured is within acceptable tolerances, or if a warning should be issued that a circuit failure is likely.

As mentioned above, the present invention may include a circuit log 222 to periodically record the current draw and operating conditions of the electronic circuit 106. The circuit log 222 is recorded in computer readable memory, and can be used to troubleshoot the electronic device and help determine if the electronic circuit 106 is functioning properly. It is contemplated that the circuit log 222 is used when a technician has detected a system failure or anomaly and the cause is unknown. By examining the each circuit's log file 222, the technician can quickly narrow down the origin of the system failure or anomaly.

In one embodiment of the invention, an operation matrix 224 is used to store the various combinations of operating conditions and current draw that are considered acceptable for the electronic circuit 106. If the operating conditions and current draw fall outside the pass ranges recorded in the operation matrix 224, the processing module 210 alerts the manager of the possibility that the circuit will soon fail. Table 1 shows a portion of an exemplary operation matrix 224 that may be used with one embodiment of the present invention. It is contemplated that an operation matrix may be created for each current conductor 204 monitored.

TABLE 1

Exemplary Operation Matrix

| Environment | Self Test Current | Idle Current | Command Current | Read Current | Write Current |
| --- | --- | --- | --- | --- | --- |
| Temp low Humidity low | | | | | |
| Temp high Humidity low | | | | | |
| Temp low Humidity high | | | | | |
| Temp high Humidity high | | | | | |

In accordance with one embodiment of the invention, the operation matrix 224 is created while the electronic circuit 106 is being manufactured. For example, the electronic circuit 106 may be placed on a test bed in a controlled environment chamber and cycled through various operating conditions. During this process, current readings from the voltage supplies 202 are taken and used to construct the operation matrix 224. The operation matrix 224 can be recorded in nonvolatile memory, such as ROM or FLASH memory, for later access by the processing module 210. It is contemplated that the invention can be further configured to learn the current values required by a circuit under different conditions (temperature, speed of operation, operation load, etc.).

Figure 3:
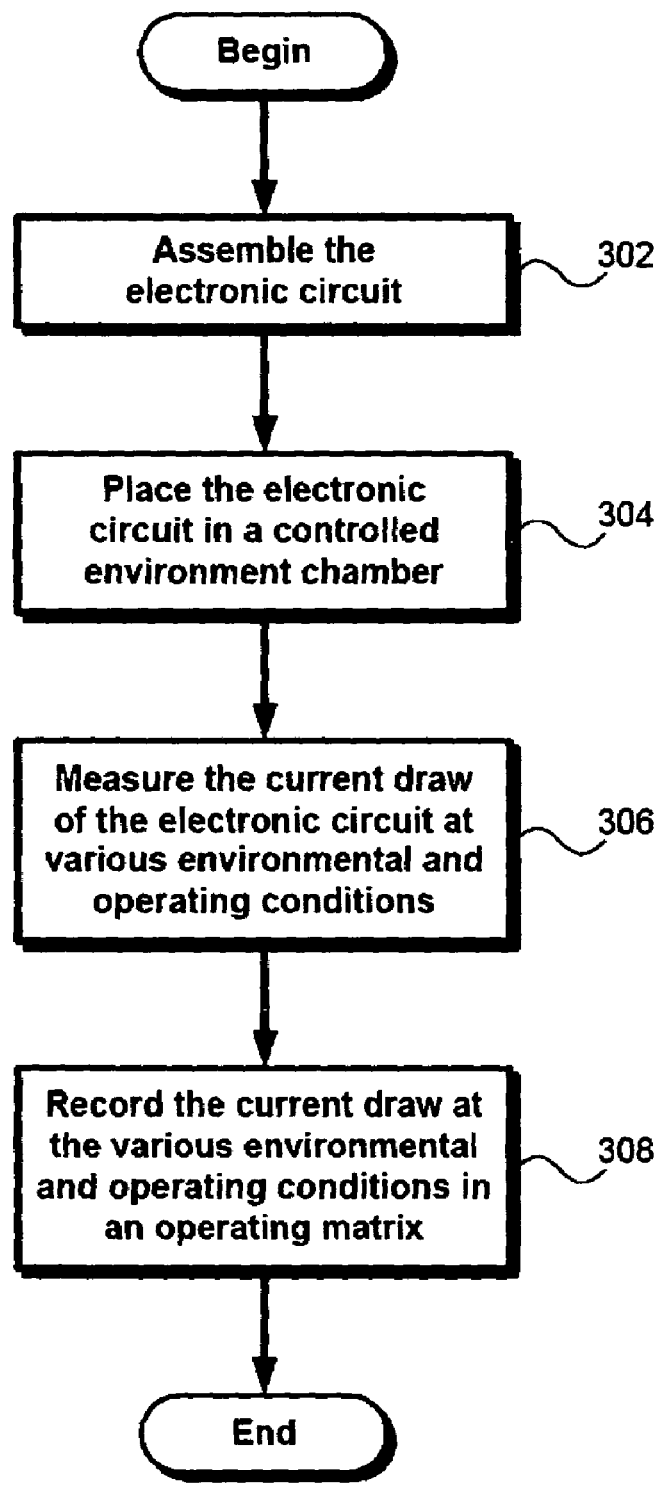
FIG. 3 shows a process for manufacturing an electronic circuit, as contemplated by one embodiment of the present invention.

FIG. 3 shows a process for manufacturing an electronic circuit as contemplated by one embodiment of the present invention. The process begins at assembling operation 302, where the electronic circuit is constructed according to known manufacturing methods. Assembling operation 302, for example, may include utilizing pick and place machines, soldering and/or etching techniques. Once the circuit is assembled, control passes to placing operation 304.

At placing operation 304, the electronic circuit is placed in a controlled testing environment, such as an environment chamber. Once inside the controlled environment, the electronic circuit can be operated at various environmental conditions. For example, the environment chamber may be used to subject the electronic circuit to various temperatures, pressures, humidity levels, and other environmental conditions. After placing operation 304 is completed, process flow continues to measuring operation 306.

At measuring operation 306, the electronic circuit is cycled through various environmental and operating conditions. For example, the electronic circuit may be operated at different operating conditions, such as self test, idle, command, read, and write conditions, while being subjected to different environmental conditions, such as low, medium, and high temperatures. During measuring operation 306, the current draw of the electronic circuit at the various environmental and operating conditions is measured. The measurements may be taken several times for each condition and averaged together. It is contemplated that during the measuring operation 306, quality control may also be performed and electronic circuits not meeting the manufacturer's nominal specifications may be rejected. After the measuring operation 306 is completed, process control passes to recording operation 308.

At recording operation 308, the current readings at the various environmental and operating conditions are recorded in an operating matrix. As discussed above, the operating matrix is configured to be used during field operation of the electronic circuit to alert when the current draw to the electronic device is outside a pass range. Since current draw can indicate a potential malfunction of the circuit, the operating matrix can be used to alert a technician when the electric circuit appears close to failing, or to isolate a failed circuit.

Figure 4:
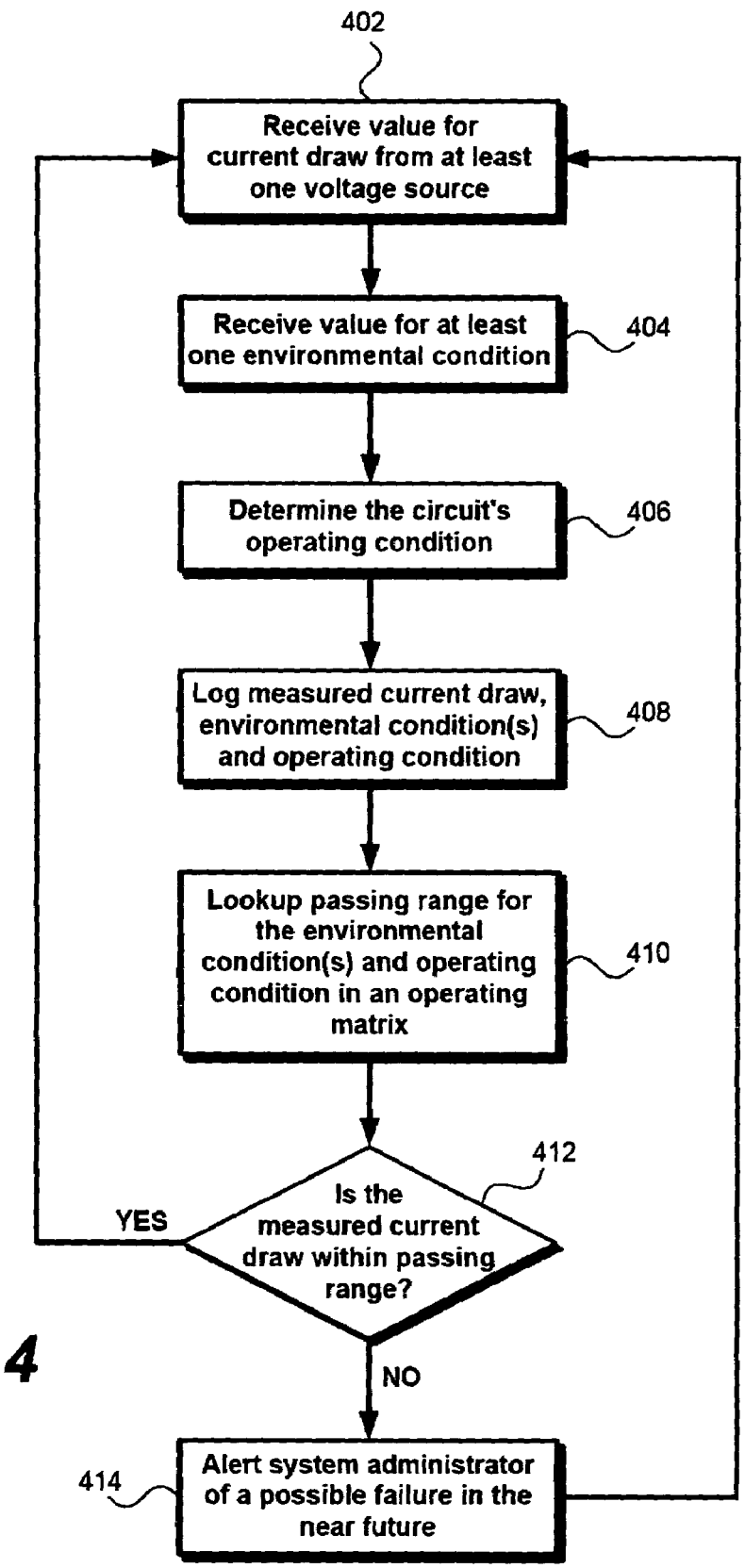
FIG. 4 shows one method for predicting the failure of an electronic circuit in an electronic device, as contemplated by the present invention.

In FIG. 4, one method for predicting the failure of an electronic circuit in an electronic device contemplated by the present invention is shown. It should be remarked that the logical operations of the method may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

The method begins at receiving operation 402. During this operation, the current dissipation of the electronic circuit from the circuit's voltage sources is measured and received. It is contemplated that in addition to monitoring gross voltage lines, the invention may monitor the current draw of significant functions of the circuit. For example, in a communication card, the current monitor may be configured to measure the current dissipation of a high-speed (i.e., 10 Gbps) serializer-deserializer (SerDes). In such a configuration, the invention may help predict increases in bit error rate as well as circuit failure. Once receiving operation 402 is completed, control passes to receiving operation 404.

At receiving operation 404, at least one environmental condition is measured and received by an environment monitor. As mentioned above, there can be several environmental conditions monitored by the invention. When choosing which environmental conditions to monitor, a designer may take into account the field conditions the circuit will be exposed to and their effects on current dissipation. Monitored environmental conditions may include temperature, pressure, humidity and electro-magnetic interference. After receiving operation 404 is completed, control passes to determining operation 406.

At determining operation 406, a circuit state monitor determines the circuit's operating condition. It is contemplated that the state monitor can be a software process running in the background of the circuit's operations. Alternatively, the state monitor can be embodied in hardware and can monitor, for example, the system bus for micro-code instructions or addresses that indicate the circuit's conditions. Thus, in one embodiment of the invention, the circuit's operating condition may include information about the operation(s) carried out by the circuit at the time the current measurements are taken. In other embodiments of the invention, the circuit's operating condition may include information about the circuit's CPU utilization, clock frequency, and other operating conditions that affect the circuit's current draw. The state monitor may also be configured to detect when a particular segment of the circuit drawing large amounts of current is active. Once determining operation 406 is completed, control passes to logging operation 408.

At logging operation 408, the current draw, environmental conditions, operating condition and time of log entry are recorded for future inspection. As discussed above, the circuit log can be a useful in isolating a failed circuit from a group of circuits. The log may record values at periodic intervals or every time there is a significant change in one of the values. After logging operation 408 is completed, control passes to lookup operation 410.

At lookup operation 410, the passing range for the measured environment conditions, in conjunction with the circuit's operating condition, is determined. The prediction of failure is therefore based on the environmental and operating conditions of the circuit, as well as the circuit's current utilization. By providing for environmental and operating conditions, predictions of false failures are minimized. In one embodiment, the passing range is found by accessing an operating matrix (see discussion above). In another embodiment of the invention, the passing range is may be determined using a best-fit algorithm or using other techniques known to those skilled in the art. Once lookup operation 410 is completed, control passes to decision operation 412.

At decision operation 412, the measured current draw is compared with the passing range retrieved in lookup operation 410. If the measured current draw is within the passing range, control returns to measuring operation 402, where the process is repeated. If, however, the measured current draw falls outside the passing range, control passes to alerting operation, where a system manager is alerted to the fact that the circuit's measured current draw has fallen outside its passing range.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for predicting the failure of an electronic circuit in an electronic device, the method comprising:
   receiving a measured value for current draw of the electronic circuit from at least one voltage supply;
   receiving at least one measured value for an environmental condition, wherein the environmental condition includes an environment temperature;
   monitoring at least one operating condition of the electronic circuit, wherein the operating condition includes a CPU utilization level;
   determining if the measured current draw is outside a pass range for the measured environmental condition and for the operating condition of the electronic circuit; and
   alerting of a potential failure of the electronic circuit if the measured current draw is outside the pass range.

2. The method of claim 1, further comprising recording the current draw and environmental condition of the electronic circuit in a circuit log.

3. The method of claim 2, wherein if the electronic circuit fails, isolating the electronic circuit from among a plurality of potentially failed electronic circuits in the electronic device using the recorded current draw and environmental condition of the electronic circuit.

4. The method of claim 1, further comprising monitoring the current draw of significant circuit functions.

5. The method of claim 1, wherein the wherein the at least one environmental condition includes an environment humidity.

6. A method for predicting the failure of an electronic circuit in an electronic device, the method comprising:
   receiving a measured value for current draw of the electronic circuit from at least one voltage supply;
   receiving at least one measured value for an environmental condition, wherein the environmental condition includes an environment temperature;
   monitoring at least one operating condition of the electronic circuit, wherein the operating condition includes a clock frequency;
   determining if the measured current draw is outside a pass range for the measured environmental condition and for the operating condition of the electronic circuit; and
   alerting of a potential failure of the electronic circuit if the measured current draw is outside the pass range.

7. A system for predicting the failure of an electronic circuit, the system comprising:
   a current monitor configured to receive a measured value for a current draw to the electronic circuit from at least one voltage source;
   an environment monitor configured to receive a measured value for at least one environmental condition of the electronic circuit, wherein the at least one environmental condition includes an environment temperature;
   a circuit state monitor configured to determine at least one operating condition of the electronic circuit, wherein the at least one operating condition includes a CPU utilization level; and
   a failure alert unit configured to provide an alert notification when the current draw to the electronic circuit is outside a pass range at the measured environmental condition and the measured operating condition of the electronic circuit.

8. The system of claim 7, wherein the at least one operating condition includes a clock frequency.

9. The system of claim 7, further comprising a circuit log configured to record the current draw, environmental condition and operating condition in computer readable memory.

10. The system of claim 7, wherein the current monitor is further configured to measure the current draw of significant circuit functions.

11. The system of claim 7, wherein the at least one environmental condition includes an environment humidity.

12. The system of claim 7, wherein the operating condition is an operating condition which the electronic circuit was designed to operate at.

13. A method for manufacturing an electronic circuit, the method comprising:
    assembling the electronic circuit;
    measuring a current draw of the electronic circuit at different environment conditions and operating conditions, wherein the different environmental conditions include an environment temperature;
    monitoring the current draw of significant circuit functions; and
    recording the current draw in an operating matrix, the operating matrix configured to be used during normal operation of the electronic circuit to alert when the current draw to the electronic circuit is outside a pass range at the measured environmental condition.

14. The method of claim 13, wherein recording the current draw in an operation matrix further comprises recording the current draw in nonvolatile memory.

15. The method of claim 13, further comprising placing the assembled electronic circuit in a controlled environment.

16. The method of claim 13, wherein the different environmental conditions include environment humidity.

17. A computer program product embodied in a tangible media comprising:
    computer readable program codes coupled to the tangible media for predicting the failure of an electronic circuit in an electronic device, the computer readable program codes configured to cause the program to:
    measure a current draw of the electronic circuit from at least one voltage supply;
    measure at least one environmental condition at the electronic circuit, wherein the at least one environmental condition includes an environment temperature;
    monitor at least one operating condition of the electronic circuit, wherein the operating condition includes a clock frequency;
    determine if the measured current draw is outside a pass range for the measured environmental condition and the operating condition of the electronic circuit; and
    alert of a potential failure of the electronic circuit if the measured current draw is outside the pass range.

18. The computer program product of claim 17, wherein the operating condition includes a CPU utilization level.

19. The computer program product of claim 17, further comprising computer readable program code configured to cause the program to record the current draw and environmental condition of the electronic circuit in a circuit log.

20. The computer program product of claim 17, further comprising computer readable program code configured to cause the program to monitor the current draw of significant circuit functions.

21. The computer program product of claim 17, wherein the different environmental conditions include environment humidity.

22. A system for predicting the failure of an electronic circuit in an electronic device, the the system comprising:
    means for receiving a measured value for current draw of the electronic circuit from at least one voltage supply;
    means for receiving at least one measured value for an environmental condition, wherein the at least one environmental condition includes an environment temperature;
    means for monitoring at least one operating condition of the electronic circuit, wherein the operating condition includes a clock frequency;
    means for determining if the measured current draw is outside a pass range for the measured environmental condition and the operating condition of the electronic circuit; and
    means for alerting of a potential failure of the electronic circuit if the measured current draw is outside the pass range.

* * * * *